United States Patent
Hoslet et al.

(10) Patent No.: US 9,284,442 B2
(45) Date of Patent: *Mar. 15, 2016

(54) CAPS AND CLOSURES COMPRISING A PROPYLENE RANDOM COPOLYMER, AND A METHOD FOR PRODUCING THEM

(75) Inventors: Philippe Hoslet, Manage (BE); Patrizio Andriolo, Morlanwelz (BE)

(73) Assignee: TOTAL RESEARCH & TECHNOLOGY FELUY, Seneffe (Feluy) (BE)

( * ) Notice: Subject to any disclaimer, the term of this patent is extended or adjusted under 35 U.S.C. 154(b) by 72 days.

This patent is subject to a terminal disclaimer.

(21) Appl. No.: 13/991,200

(22) PCT Filed: Dec. 1, 2011

(86) PCT No.: PCT/EP2011/071575
§ 371 (c)(1),
(2), (4) Date: Aug. 16, 2013

(87) PCT Pub. No.: WO2012/072776
PCT Pub. Date: Jun. 7, 2012

(65) Prior Publication Data
US 2013/0324661 A1    Dec. 5, 2013

(30) Foreign Application Priority Data

Dec. 1, 2010   (EP) .................................... 10193258
Mar. 23, 2011  (EP) .................................... 11159350

(51) Int. Cl.
| C08F 210/06 | (2006.01) |
| C08F 210/02 | (2006.01) |
| C08L 23/14 | (2006.01) |
| B65D 41/00 | (2006.01) |
| B65D 65/38 | (2006.01) |
| C08L 23/12 | (2006.01) |
| C08L 23/16 | (2006.01) |

(52) U.S. Cl.
CPC ................ C08L 23/14 (2013.01); B65D 41/00 (2013.01); B65D 65/38 (2013.01); C08F 210/06 (2013.01); C08F 210/02 (2013.01); C08L 23/12 (2013.01); C08L 23/16 (2013.01); C08L 2205/02 (2013.01); C08L 2205/025 (2013.01); C08L 2314/02 (2013.01); C08L 2314/06 (2013.01)

(58) Field of Classification Search
CPC ..... C08L 23/12; C08L 23/16; C08L 2205/02; C08L 2205/025; C08L 2314/02; C08L 2314/06; C08F 210/02; C08F 210/06
See application file for complete search history.

(56) References Cited

U.S. PATENT DOCUMENTS

| 6,635,715 B1 * | 10/2003 | Datta et al. ..................... 525/240 |
| 2003/0149199 A1 * | 8/2003 | Schottek et al. .............. 526/126 |
| 2006/0020096 A1 | 1/2006 | Schottek et al. |

FOREIGN PATENT DOCUMENTS

| EP | 0152701 A1 | 8/1985 |
| EP | 0368577 A2 | 5/1990 |
| EP | 1 857 475 A1 | 11/2007 |
| JP | 11-302471 | 11/1999 |
| JP | 2000-191862 A | 7/2000 |
| JP | 2003-533550 A | 11/2003 |
| JP | 2005-075847 A | 3/2005 |
| JP | 2009-084393 A | 4/2009 |
| WO | 01/48034 A2 | 7/2001 |
| WO | 03102069 A1 | 12/2003 |

OTHER PUBLICATIONS

International Search Report for International Application No. PCT/EP2011/071575, mailed on Dec. 27, 2011 (2 pages).
Blomenhofer et al., Designer Nucleating Agents for Polypropylene, Macromolecules 2005, 38, 3688-3695.
Razavi et al., The Geometry of the Site and its Relevance for Chain Migration and Stereospecificity, Macromol. Symp., vol. 89, pp. 345-367, 1995.
H. N. Cheng, 13C Nuclear Magnetic Resonance Characterization of poly(propylene) Prepared with Homogeneous Catalysts, J. Ewen, Makromol. Chem., vol. 190 (1989), pp. 1931-1940.
G. J. Ray et al. "Carbon-13 Nuclear Magnetic Resonance Determination of Monomer Composition and Sequence Distributions in Ethylene-Propylene Copolymers Prepared with a Stereoregular Catalyst System", Macromolecules, vol. 10, No. 4, 1977, p. 773-778.
Plastics Additives Handbook, ed. H. Zweifel, 5th edition, 2001, Hanser Publishers.
Office Action issued in Japanese Application No. 2013-541364, dated Nov. 17, 2015, 6 pages with English translation.

* cited by examiner

*Primary Examiner* — Richard A Huhn
(74) *Attorney, Agent, or Firm* — Albert Shung

(57) ABSTRACT

The present invention relates to caps and closures comprising a specific propylene random copolymer, obtained by polymerization with a metallocene-based polymerization catalyst.

23 Claims, No Drawings

CAPS AND CLOSURES COMPRISING A PROPYLENE RANDOM COPOLYMER, AND A METHOD FOR PRODUCING THEM

CROSS-REFERENCE TO RELATED APPLICATIONS

This application claims the benefit of PCT/EP 2011/071575, filed on Dec. 1, 2011, which claims priority from EP 10193258.0, filed on Dec. 1, 2010, and EP 11159350.5, filed on Mar. 23, 2011.

FIELD OF THE INVENTION

The present invention relates to caps and closures comprising a specific propylene random copolymer, obtained by polymerization with a metallocene-based polymerization catalyst.

THE TECHNICAL PROBLEM AND THE PRIOR ART

Polypropylene offers a unique combination of mechanical and chemical properties. It has therefore found wide use in a large number of applications, each with its own specific requirements, with caps and closures being one of these applications.

Polypropylene caps and closures may be used in the packaging of carbonated soft drinks, carbonated and still water, juices, detergents, cosmetics, hygiene products, chemicals, medical solutions and others. Depending upon the liquid to be packaged and the intended handling, caps and closures and in consequence the polypropylene used in their manufacture need to comply with different requirements. Cosmetics, such as for example shampoos and shower gels, often require caps and closures with a hinge that can easily be opened and closed. Others, such as for example detergents, might require child-proof closures. Still others, such as for example medical solutions, might require tamper-evident closures.

In addition, environmental concerns are one of the driving forces in reducing the weight of packaging, including the weight of caps and closures. However, such weight reduction is only possible if the lighter caps and closures still fulfill the requirements demanded by the respective application, e.g. they do not leak, have sufficient life time, allow a sufficient number of opening and closing cycles etc. Hence, such reduction in weight of caps and closures also leads to different requirements with respect to the polypropylene used in their manufacture.

While the manufacturers of polypropylene have continuously worked to improve the properties of polypropylene used in the manufacture of caps and closures, the ever increasing requirements necessitate the further development of polypropylene adapted to these requirements.

In consequence, it is an object of the present application to provide caps and closures with good mechanical properties.

It is a further object of the present application to provide caps and closures with good organoleptics or low volatiles or both.

It is also an object of the present application to provide an efficient process for the production of such caps and closures.

BRIEF DESCRIPTION OF THE INVENTION

The presently named inventors have surprisingly found that any of these objects can be attained either individually or in any combination by the caps and closures and the process for their manufacture as described in detail in the present application.

Thus, the present application provides caps or closures consisting of a polypropylene composition, which comprises at least 70 wt %, relative to the total weight of said polypropylene composition, of a random copolymer of propylene and at least one comonomer, said at least one comonomer being different from propylene, wherein said random copolymer has a comonomer content of at most 4.0 wt %, relative to the total weight of said random copolymer, a molecular weight distribution, defined as $M_w/M_n$, of at most 4.0 and a percentage of 2,1-insertions of at least 0.1%, relative to the total number of propylene molecules in the polymer chain.

Further, the present application provides for a process for the manufacture of these caps and closures, said process comprising the steps of
(a) polymerizing propylene and at least one comonomer with a metallocene-based polymerization catalyst to obtain a random copolymer of propylene and at least one comonomer,
(b) melting a polypropylene composition, which comprises at least 70 wt %, relative to the total weight of said polypropylene composition, of the random copolymer of propylene and at least one comonomer obtained in step (a);
(c) injecting the molten polypropylene composition of step (b) into an injection mold;
(d) cooling the mold to solidify the polypropylene composition; and
(e) recovering the injection-molded cap or closure,
wherein said at least one comonomer is different from propylene, and wherein said random copolymer has a comonomer content of at most 4.0 wt %, relative to the total weight of said random copolymer, a molecular weight distribution, defined as $M_w/M_n$, of at most 4.0 and a percentage of 2,1-insertions of at least 0.1%, relative to the total number of propylene molecules in the polymer chain.

DETAILED DESCRIPTION OF THE INVENTION

Throughout the present application, the term "propylene random copolymer" may be used to denote a "random copolymer of propylene and at least one comonomer".

In general terms, the present application provides for a cap or closure consisting of a polypropylene composition, which comprises at least 70 wt %, relative to the total weight of said polypropylene composition, of a random copolymer of propylene and at least one comonomer. Preferably, said polypropylene composition comprises at least 80 wt %, preferably at least 90 wt % or 95 wt %, even more preferably at least 97 wt %, and still even more preferably at least 99 wt %, relative to the total weight of said polypropylene composition, of the propylene random copolymer. Most preferably, the polypropylene composition consists of the propylene random copolymer. The remainder of the polypropylene composition may be one or more thermoplastic polymers as defined in the present application.

Preferably, the random copolymer of propylene and at least one comonomer is a random copolymer of propylene and one comonomer.

The propylene random copolymer used herein has a comonomer content of at most 4.0 wt %, relative to the total weight of said propylene random copolymer. Preferably, the comonomer content is at most 3.5 wt %, and most preferably at most 3.0 wt %. Preferably, the comonomer content is at least 0.5 wt %, more preferably at least 1.0 wt %, even more preferably at least 1.2 wt % or 1.3 wt %, still even more preferably at least 1.4 wt % and most preferably at least 1.5 wt %. The comonomer content can for example be determined by $^{13}$C-NMR spectroscopy as described in detail in the examples or by FT-IR spectroscopy.

Preferably, the propylene random copolymer is a random copolymer of propylene and at least one comonomer, wherein the at least one comonomer is an alpha-olefin being different from propylene. More preferably, the at least one comonomer is selected from the group consisting of ethylene, butene-1, pentene-1, hexene-1 and 4-methyl-pentene-1. Even more preferably, the at least one comonomer is selected from the group consisting of ethylene, butene-1 and hexene-1. Most preferably, the at least one comonomer is ethylene.

The propylene random copolymer used herein has a molecular weight distribution, defined as $M_w/M_n$, i.e. the ratio of weight average molecular weight $M_w$ and number average molecular weight $M_n$, of at most 4.0, more preferably of at most 3.5, even more preferably of at most 3.0, and most preferably of at most 2.8. Preferably said molecular weight distribution is at least 1.0, more preferably at least 1.5, and most preferably at least 2.0. Molecular weights can be determined by size exclusion chromatography (SEC), frequently also referred to as gel permeation chromatography (GPC), as described in detail in the examples.

The propylene random copolymer used herein is characterized by a percentage of 2,1-insertions, relative to the total number of propylene molecules in the polymer chain, of at least 0.1%. Preferably, the percentage of 2,1-insertions is at most 1.5%, more preferably at most 1.3%, even more preferably at most 1.2%, still even more preferably at most 1.1%, and most preferably at most 1.0%. The method for determining the percentage of 2,1-insertions is given in the test methods.

Preferably, the propylene random copolymer used herein is characterized by a high isotacticity, for which the content of mmmm pentads is a measure. Preferably, the content of mmmm pentads is at least 90%, more preferably at least 95%, and most preferably at least 97%. The isotacticity may be determined by $^{13}$C-NMR analysis as described in the test methods.

Preferably, the propylene random copolymer used herein has a melt flow index (MFI), determined as described in the test methods, of at least 20 dg/min, more preferably of at least 30 dg/min or 40 dg/min or 50 dg/min or 60 dg/min, even more preferably of at least 70 dg/min, still even more preferably of at least 80 dg/min, and most preferably of at least 100 dg/min. Preferably, the melt flow index is at most 200 dg/min, more preferably at most 180 dg/min and most preferably at most 160 dg/min.

It has come as a great surprise to the presently named inventors that the propylene random copolymer as defined above was found to have excellent properties with respect to organoleptics as evidenced by a much reduced taste intensity of 1.6 versus 2.4 for a polyethylene terephthalate (PET) used in the production of bottles.

The propylene random copolymer used herein may be obtained by polymerizing propylene and at least one comonomer with a metallocene-based polymerization catalyst. Preferably the metallocene-based polymerization catalyst comprises a bridged metallocene component, a support and an activating agent. Such metallocene-based polymerization catalysts are generally known in the art.

The metallocene component can be described by the following general formula

    (I)

wherein $R^a$, $R^b$, $R^c$, M, $X^1$ and $X^2$ are as defined below.

$R^a$ is the bridge between $R^b$ and $R^c$, i.e. $R^a$ is chemically connected to $R^b$ and $R^c$, and is selected from the group consisting of —(CR$^1$R$^2$)$_p$—, —(SiR$^1$R$^2$)$_p$—, —(GeR$^1$R$^2$)$_p$—, —(NR$^1$)$_p$—, —(PR$^1$)$_p$—, —(N$^+$R$^1$R$^2$)$_p$— and —(P$^+$R$^1$R$^2$)$_p$—, and p is 1 or 2, and wherein R$^1$ and R$^2$ are each independently selected from the group consisting of hydrogen, C$_1$-C$_{10}$ alkyl, C$_5$-C$_8$ cycloalkyl, C$_6$-C$_{15}$ aryl, alkylaryl with C$_1$-C$_{10}$ alkyl and C$_6$-C$_{15}$ aryl, or any two neighboring R (i.e. two neighboring R$^1$, two neighboring R$^2$, or R$^1$ with a neighboring R$^2$) may form a cyclic saturated or non-saturated C$_4$-C$_{10}$ ring; each R$^1$ and R$^2$ may in turn be substituted in the same way. Preferably $R^a$ is —(CR$^1$R$^2$)$_p$— or —(SiR$^1$R$^2$)$_p$— with R$^1$, R$^2$ and p as defined above. Most preferably $R^a$ is —(SiR$^1$R$^2$)$_p$— with R$^1$, R$^2$ and p as defined above. Specific examples of $R^a$ include Me$_2$C, ethanediyl (—CH$_2$—CH$_2$—), Ph$_2$C and Me$_2$Si.

M is a metal selected from Ti, Zr and Hf, preferably it is Zr.

$X^1$ and $X^2$ are independently selected from the group consisting of halogen, hydrogen, C$_1$-C$_{10}$ alkyl, C$_6$-C$_{15}$ aryl, alkylaryl with C$_1$-C$_{10}$ alkyl and C$_6$-C$_{15}$ aryl. Preferably $X^1$ and $X^2$ are halogen or methyl.

$R^b$ and $R^c$ are selected independently from one another and comprise a cyclopentadienyl ring.

Preferred examples of halogen are Cl, Br, and I. Preferred examples of C$_1$-C$_{10}$ alkyl are methyl, ethyl, n-propyl, iso-propyl, n-butyl, iso-butyl, and tert-butyl. Preferred examples of C$_5$-C$_7$ cycloalkyl are cyclopentyl, cyclohexyl, cycloheptyl and cyclooctyl. Preferred examples of C$_6$-C$_{15}$ aryl are phenyl and indenyl. Preferred examples of alkylaryl with C$_1$-C$_{10}$ alkyl and C$_6$-C$_{15}$ aryl are benzyl (—CH$_2$-Ph), and —(CH$_2$)$_2$-Ph.

Preferably, $R^b$ and $R^c$ may both be substituted cyclopentadienyl, or may be independently from one another unsubstituted or substituted indenyl or tetrahydroindenyl, or $R^b$ may be a substituted cyclopentadienyl and $R^c$ a substituted or unsubstituted fluorenyl. More preferably, $R^b$ and $R^c$ may both be the same and may be selected from the group consisting of substituted cyclopentadienyl, unsubstituted indenyl, substituted indenyl, unsubstituted tetrahydroindenyl and substituted tetrahydroindenyl. By "unsubstituted" is meant that all positions on $R^b$ resp. $R^c$, except for the one to which the bridge is attached, are occupied by hydrogen. By "substituted" is meant that, in addition to the position at which the bridge is attached, at least one other position on $R^b$ resp. $R^c$ is occupied by a substituent other than hydrogen, wherein each of the substituents may independently be selected from the group consisting of C$_1$-C$_{10}$ alkyl, C$_5$-C$_7$ cycloalkyl, C$_6$-C$_{15}$ aryl, and alkylaryl with C$_1$-C$_{10}$ alkyl and C$_6$-C$_{15}$ aryl, or any two neighboring substituents may form a cyclic saturated or non-saturated C$_4$-C$_{10}$ ring.

A substituted cyclopentadienyl may for example be represented by the general formula C$_5$R$^3$R$^4$R$^5$R$^6$. A substituted indenyl may for example be represented by the general formula C$_9$R$^7$R$^8$R$^9$R$^{10}$R$^{11}$R$^{12}$R$^{13}$R$^{14}$. A substituted tetrahydroindenyl may for example be represented by the general formula C$_9$H$_4$R$^{15}$R$^{16}$R$^{17}$R$^{18}$. A substituted fluorenyl may for example be represented by the general formula C$_{13}$R$^{19}$R$^{20}$R$^{21}$R$^{22}$R$^{23}$R$^{24}$R$^{25}$R$^{26}$. Each of the substituents R$^3$ to R$^{26}$ may independently be selected from the group consisting of hydrogen, C$_1$-C$_{10}$ alkyl, C$_5$-C$_7$ cycloalkyl, C$_6$-C$_{15}$ aryl, and alkylaryl with C$_1$-C$_{10}$ alkyl and C$_6$-C$_{15}$ aryl, or any two neighboring R may form a cyclic saturated or non-saturated C$_4$-C$_{10}$ ring; provided, however, that not all substituents simultaneously are hydrogen.

Preferred metallocene components are those having $C_2$-symmetry or those having $C_1$-symmetry. Most preferred are those having $C_2$-symmetry.

Particularly suitable metallocene components are those wherein $R^b$ and $R^c$ are the same and are substituted cyclopentadienyl, preferably wherein the cyclopentadienyl is substituted in the 2-position, the 3-position, or simultaneously the 2-position and the 3-position.

Particularly suitable metallocene components are also those wherein $R^b$ and $R^c$ are the same and are selected from the group consisting of unsubstituted indenyl, unsubstituted tetrahydroindenyl, substituted indenyl and substituted tetrahydroindenyl. Substituted indenyl is preferably substituted in the 2-position, the 3-position, the 4-position, the 5-position or any combination of these, more preferably in the 2-position, the 4-position or simultaneously in the 2-position and the 4-position. Substituted tetrahydroindenyl is preferably substituted in the 2-position, the 3-position, or simultaneously the 2-position and the 3-position.

Particularly suitable metallocene components may also be those wherein $R^b$ is a substituted cyclopentadienyl and $R^c$ is a substituted or unsubstituted fluorenyl. The substituted cyclopentadienyl is preferably substituted in the 2-position, the 3-position, the 5-position or simultaneously any combination of these, more preferably in the 3-position or the 5-position or both simultaneously, most preferably in the 3-position only, with a bulky substituent. Said bulky substituent may for example be —$CR^{27}R^{28}R^{29}$ or —$SiR^{27}R^{28}R^{29}$ with $R^{27}$, $R^{28}$ and $R^{29}$ independently selected from group consisting of $C_1$-$C_{10}$ alkyl, $C_5$-$C_7$ cycloalkyl, $C_6$-$C_{15}$ aryl, and alkylaryl with $C_1$-$C_{10}$ alkyl and $C_6$-$C_{15}$ aryl, or any two neighboring R may form a cyclic saturated or non-saturated $C_4$-$C_{10}$ ring. it is preferred that $R^{27}$, $R^{28}$ and $R^{29}$ are methyl.

Examples of particularly suitable metallocenes are:
dimethylsilanediyl-bis(2-methyl-cyclopentadienyl)zirconium dichloride,
dimethylsilanediyl-bis(3-methyl-cyclopentadienyl)zirconium dichloride,
dimethylsilanediyl-bis(3-tert-butyl-cyclopentadienyl)zirconium dichloride,
dimethylsilanediyl-bis(3-tert-butyl-5-methyl-cyclopentadienyl)zirconium dichloride,
dimethylsilanediyl-bis(2,4-dimethyl-cyclopentadienyl)zirconium dichloride,
dimethylsilanediyl-bis(indenyl)zirconium dichloride,
dimethylsilanediyl-bis(2-methyl-indenyl)zirconium dichloride,
dimethylsilanediyl-bis(3-methyl-indenyl)zirconium dichloride,
dimethylsilanediyl-bis(3-tert-butyl-indenyl)zirconium dichloride,
dimethylsilanediyl-bis(4,7-dimethyl-indenyl)zirconium dichloride,
dimethylsilanediyl-bis(tetrahydroindenyl)zirconium dichloride,
dimethylsilanediyl-bis(benzindenyl)zirconium dichloride,
dimethylsilanediyl-bis(3,3'-2-methyl-benzindenyl)zirconium dichloride,
dimethylsilanediyl-bis(4-phenyl-indenyl)zirconium dichloride,
dimethylsilanediyl-bis(2-methyl-4-phenyl-indenyl)zirconium dichloride,
ethanediyl-bis(indenyl)zirconium dichloride,
ethanediyl-bis(tetrahydroindenyl)zirconium dichloride,
isopropylidene-(3-tert-butyl-cyclopentadienyl)(fluorenyl) zirconium dichloride
isopropylidene-(3-tert-butyl-5-methyl-cyclopentadienyl) (fluorenyl)zirconium dichloride.

The metallocene may be supported according to any method known in the art. In the event it is supported, the support used in the present invention can be any organic or inorganic solid, particularly porous supports such as talc, inorganic oxides, and resinous support material such as polyolefin. Preferably, the support material is an inorganic oxide in its finely divided form.

The propylene random copolymer used in the present application is produced by polymerizing propylene and at least one comonomer in presence of a metallocene-based polymerization catalyst to obtain a metallocene random copolymer of propylene and at least one comonomer. The polymerization of propylene and the at least one comonomer in presence of a metallocene-based polymerization catalyst can be carried out according to known techniques in one or more polymerization reactors. The metallocene propylene random copolymer used herein is preferably produced by polymerization in liquid propylene at temperatures in the range from 20° C. to 150° C. or from 20° C. to 100° C. More preferred temperatures are in the range from 60° C. to 80° C. The pressure can be atmospheric or higher. It is preferably between 25 and 50 bar. The molecular weight of the polymer chains, and in consequence the melt flow of the resulting metallocene propylene random copolymer, may be controlled by the addition of hydrogen to the polymerization medium.

Preferably, the propylene random copolymer is directly recovered from the one or more polymerization reactors without any further treatment to reduce its molecular weight or narrow its molecular weight distribution, as can for example be done by thermal or chemical degradation and is often done for propylene polymers produced with a Ziegler-Natta polymerization catalyst.

Preferably, the propylene random copolymer comprises at least one additive selected from the group consisting of nucleating agents, antistatic agents, processing aids and blends of any of these, such as a blend of nucleating agent(s) and antistatic agent(s) or a blend of nucleating agent(s) and processing aid(s) or a blend of antistatic agent(s) and processing aid(s) or a blend of all three.

Nucleating Agents

Preferably, the propylene random copolymer used herein comprises one or more nucleating agents, more specifically one or more alpha-nucleating agents. For the purposes of the present application, a nucleating agent is defined as a chemical compound that raises the crystallization temperature of the polypropylene composition.

Suitable nucleating agents for use herein can be selected from any of the nucleating agents known to the skilled person. It is, however, preferred that the nucleating agent be selected from the group consisting of talc, carboxylate salts, sorbitol acetals, phosphate ester salts, substituted benzene tricarboxamides and polymeric nucleating agents, as well as blends of these.

Examples for carboxylate salts are organocarboxylic acid salts. Particular examples are sodium benzoate and lithium benzoate. The organocarboxylic acid salts may also be alicyclic organocarboxylic acid salts, preferably bicyclic organodicarboxylic acid salts and more preferably a bicyclo[2.2.1] heptane dicarboxylic acid salt. A nucleating agent of this type is sold as HYPERFORM® HPN-68 by Milliken Chemical.

Examples for sorbitol acetals are dibenzylidene sorbitol (DBS), bis(p-methyl-dibenzylidene sorbitol) (MDBS), bis(p-ethyl-dibenzylidene sorbitol), bis(3,4-dimethyl-dibenzylidene sorbitol) (DMDBS), and bis(4-propylbenzylidene) propyl sorbitol. Bis(3,4-dimethyl-dibenzylidene sorbitol)

(DMDBS) and bis(4-propylbenzylidene) propyl sorbitol are preferred. These can for example be obtained from Milliken Chemical under the trade names of Millad 3905, Millad 3940, Millad 3988 and Millad NX8000.

Examples of phosphate ester salts are salts of 2,2'-methylene-bis-(4,6-di-tert-butylphenyl)phosphate. Such phosphate ester salts are for example available as NA-11 or NA-21 from Asahi Denka.

Examples of substituted tricarboxamides are those of general formula (II)

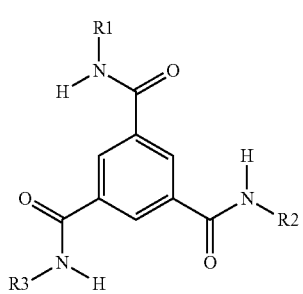

(II)

wherein R1, R2 and R3 as indicated in formula (II), independently of one another, are selected from $C_1$-$C_{20}$ alkyls, $C_5$-$C_{12}$ cycloalkyls, or phenyl, each of which may in turn by substituted with $C_1$-$C_{20}$ alkyls, $C_5$-$C_{12}$ cycloalkyls, phenyl, hydroxyl, $C_1$-$C_{20}$ alkylamino or $C_1$-$C_{20}$ alkyloxy etc. Examples for $C_1$-$C_{20}$ alkyls are methyl, ethyl, n-propyl, n-butyl, iso-butyl, tert-butyl, n-pentyl, iso-pentyl, 1,1-dimethylpropyl, 1,2-dimethylpropyl, 3-methylbutyl, hexyl, heptyl, octyl or 1,1,3,3-tetramethylbutyl. Examples for $C_5$-$C_{12}$ cycloalkyl are cyclopentyl, cyclohexyl, cyclooctyl, cyclododecyl, adamantyl, 2-methylcyclohexyl, 3-methylcyclohexyl or 2,3-dimethylcyclohexyl. Such nucleating agents are disclosed in WO 03/102069 and by Blomenhofer et al. in Macromolecules 2005, 38, 3688-3695. A specific example of such a nucleating agent is N,N',N''-tris(2-methylcyclohexyl)-1,2,3-propanetricarboxamide, which is for example commercially available from Rika International Limited under the tradename RIKACLEAR PC1.

Examples of polymeric nucleating agents are polymeric nucleating agents containing vinyl compounds, which are for example disclosed in EP-A1-0152701 and EP-A2-0368577. The polymeric nucleating agents containing vinyl compounds can either be physically or chemically blended with the metallocene random copolymer of propylene and one or more comonomers. In physical blending the polymeric nucleating agent containing vinyl compounds is mixed with the metallocene random copolymer of propylene and one or more comonomers in an extruder or in a blender. In chemical blending the metallocene random copolymer of propylene and one or more comonomers comprising the polymeric nucleating agent containing vinyl compounds is produced in a polymerization process having at least two stages, in one of which the polymeric nucleating agent containing vinyl compounds is produced. Preferred vinyl compounds are vinyl cycloalkanes or vinyl cycloalkenes having at least 6 carbon atoms, such as for example vinyl cyclopentane, vinyl-3-methyl cyclopentane, vinyl cyclohexane, vinyl-2-methyl cyclohexane, vinyl-3-methyl cyclohexane, vinyl norbornane, vinyl cylcopentene, vinyl cyclohexene, vinyl-2-methyl cyclohexene. The most preferred vinyl compounds are vinyl cyclopentane, vinyl cyclohexane, vinyl cyclopentene and vinyl cyclohexene.

Further examples of polymeric nucleating agents are poly-3-methyl-1-butene, polydimethylstyrene, polysilanes and polyalkylxylenes. As explained for the polymeric nucleating agents containing vinyl compounds, these polymeric nucleating agents can be introduced into the metallocene polypropylene either by chemical or by physical blending.

It is also possible to use high-density polyethylene, or a polypropylene having a fractional melt flow, or a polypropylene that comprises a fraction of fractional melt flow.

Further, it is possible to use blends of nucleating agents, such as for example a blend of talc and a phosphate ester salt or a blend of talc and a polymeric nucleating agent containing vinyl compounds.

The nucleating agent may be introduced into the polypropylene composition by blending it with a nucleating agent, which is either in pure form or in form of a masterbatch, for example by dry-blending or by melt-blending. It is within the scope of the present invention that the nucleating agent can be introduced into the polypropylene composition by blending it with a thermoplastic polymer comprising a nucleating agent, wherein said thermoplastic polymer is different from the metallocene random copolymer as defined above.

While it is clear to the skilled person that the amount of nucleating agent to be added depends upon its crystallization efficiency, for the purposes of the present invention the nucleating agent or the blend of nucleating agents—if comprised at all—is present in the polypropylene composition in an amount of at least 50 ppm, preferably at least 100 ppm. It is present in an amount of at most 5000 ppm, preferably of at most 4000 ppm, even more preferably of at most 3000 ppm and most preferably of at most 2000 ppm.

Processing Aid

Preferably, the propylene random copolymer used herein comprises one or more processing aids. Suitable processing aids for use herein can be selected from any of the processing aids known to the skilled person. It is, however, preferred that the processing aid be selected from the group consisting of fluoropolymer-based processing aids, silicone-based processing aids, and blends thereof.

Examples for fluoropolymer-based processing aids are polymers of vinylidene fluoride ($H_2C=CF_2$) and/or copolymers of vinylidene fluoride and hexafluoropropylene ($F_2C=CF-CF_3$). The copolymers of vinylidene fluoride and hexafluoropropylene are commonly referred to as "fluoroelastomers". The content of the comonomer hexafluoropropylene in a fluoroelastomer is usually in the range of 30 to 40% by weight. Fluoropolymers suited as processing aids are for example commercially available under the Dynamar®, Viton® and Kynar® trade names from Dyneon, DuPont-Dow Elastomers or Arkema.

Examples for silicone-based processing aids are polydimethyl silicone oils or, more preferably, high molecular weight polydimethyl siloxanes of the general formula $-(O-Si(CH_3)_2-O)_n-$. Such silicone based processing aids are for example commercially available from Dow Corning.

If present, said processing aids are preferably comprised in the propylene random copolymer in an amount of at least 50 ppm, more preferably in an amount of at least 100 ppm, and most preferably in an amount of at least 200 ppm. Said processing aids are preferably comprised in the propylene random copolymer in an amount of at most 1000 ppm, preferably in an amount of at most 800 ppm, more preferably in an amount of at most 600 ppm, even more preferably in an amount of at most 500 ppm and most preferably in an amount of at most 400 ppm.

Antistatic Agent

Preferably, the propylene random copolymer used herein comprises one or more antistatic agents. Suitable antistatic agents for use herein can be selected form any of the antistatic agents known to the skilled person. It is, however, preferred that the antistatic agent be selected from the group consisting of fatty acid esters, ethoxylated alkylamines, diethanolamides, ethoxylated alcohols, and blends thereof.

Examples of fatty acid esters are esters of fatty acids with general formula $C_mH_{2m+1}COOH$, wherein $C_mH_{2m+1}$ is a, preferably linear, hydrocarbyl group (alkyl group) with m ranging from 1 to 35, preferably from 5 to 30, even more preferably from 10 to 25, and most preferably from 15 to 20. The most preferred fatty acid esters are glycerol monostearate, glycerol distearate and glycerol tristearate.

Examples of ethoxylated amines are those of general formula $C_mH_{2m+1}N(CH_2-CH_2-OH)_2$, wherein $C_mH_{2m+1}$ is an alkyl group with m ranging from 1 to 30.

Examples of diethanolamides are those of general formula $C_mH_{2m+1}-C(O)-N(CH_2-CH_2-OH)_2$, wherein $C_mH_{2m+1}$ is an alkyl group with m ranging from 1 to 30, preferably from 5 to 25 and most preferably from 10 to 20.

Examples of ethoxylated alcohols are those of general formula $H-(O-CH_2-CH_2)_n-C_mH_{2m+1}$, wherein $C_mH_{2m+1}$ is an alkyl group with m ranging from 1 to 30, preferably from 5 to 25 and most preferably from 10 to 20, and n is preferably from 1 to 15.

If present, the one or more antistatic agents are preferably comprised in the propylene random copolymer in an amount of at least 100 ppm, more preferably of at least 200 ppm, even more preferably of at least 300 ppm, even more preferably of at least 400 ppm and most preferably of at least 500 ppm. The one or more antistatic agents are preferably comprised in the propylene random copolymer in an amount of at most 20,000 ppm or 15,000 ppm or 10,000 ppm, more preferably of at most 9,000 ppm or 8,000 ppm, even more preferably of at most 7,000 ppm or 6,000 ppm and most preferably of at most 5,000 ppm.

The propylene random copolymer used herein may also comprise further additives, such as by way of example, antioxidants, light stabilizers, acid scavengers, lubricants, and colorants. An overview of such additives as well as on suitable nucleating agents, processing aids and antistatic agents may be found in Plastics Additives Handbook, ed. H. Zweifel, 5$^{th}$ edition, 2001, Hanser Publishers.

The polypropylene composition disclosed herein may further comprise one or more thermoplastic polymers different from the propylene random copolymer defined above. Preferred suitable thermoplastic polymers are for example propylene homopolymers, copolymers of propylene and at least one comonomer, ethylene homopolymers, copolymers of ethylene and at least one comonomer, wherein said at least one comonomer is defined as stated below. Suited propylene homopolymers or copolymers may be produced with a Ziegler-Natta polymerization catalyst, i.e are for example characterized by the absence of 2,1-insertions.

Caps and closures may be produced by injection-molding. In a very general form injection-molding comprises the steps of
(a) melting the above defined polypropylene composition, which comprises at least 70 wt %, relative to the weight of said polypropylene composition, of the above defined propylene random copolymer;
(b) injecting the molten polypropylene composition of step (a) into an injection mold,
(c) cooling the mold to solidify the polypropylene composition; and
(d) recovering the injection-molded cap or closure.

Injection-molding as used herein is performed using methods and equipment well known to the person skilled in the art. The propylene random copolymer is injected into the injection mold at a melt temperature in the range from 150° C. to 300° C. Preferably the melt temperature is at least 160° C., more preferably of at least 170° C., and most preferably of at least 180° C. Preferably, the melt temperature is at most 250° C., more preferably at most 240° C., even more preferably at most 230° C. and most preferably at most 220° C.

The molds used in the production of the present caps and closures may be any mold usually used in the production of caps and closures, such as for example multi-cavity molds wherein a number of caps and closures is produced simultaneously. The propylene random copolymer as defined above is expected to be particularly suited for injection-molding using multi-cavity molds as its high fluidity and narrow molecular weight distribution may help in balancing, i.e. equal filling, of all cavities of a multi-cavity mold. Thus, the propylene random copolymer as defined above is expected to allow producing caps and closures where the molding precision, as for example determined based on the weight and dimensions of the caps and closures produced, is to be improved within the caps and closures produced within the same shot but also from shot to shot. In consequence, the productivity of the injection-molding process is expected to be significantly increased by reducing the rejection rate, i.e. the percentage of caps and closures outside of pre-determined production specifications, as well as by reducing the injection molding cycle time.

Additionally, it is expected that the caps and closures of the present application are characterized by good optical properties, such as for example by good gloss and/or good transparency.

The caps and closures of the present application are not especially limited. They may include screw-caps, caps and closures with a living hinge, glossy caps and closures, transparent caps and closures.

The caps and closures of the present application may be used in various packaging applications, such as for example food packaging, detergent packaging, cosmetic packaging, paint packaging or medical packaging. Examples in food packaging are caps and closures on tubes, bottles, such as for juices, water or milk products. Examples in detergent packaging are caps and closures for washing powders, dish soap, household cleaners. Examples in cosmetic packaging are shower gels, shampoos, oils, cremes, liquid soaps. Examples in medical packaging are packaging for pills, solutions, disinfectants.

Hence, the present application also provides for a packaging comprising the above defined caps and closures.

Test Methods

The melt flow index (MFI) of polypropylene and polypropylene compositions is determined according to ISO 1133, condition L, at 230° C. and 2.16 kg.

Molecular weights are determined by Size Exclusion Chromatography (SEC) at high temperature (145° C.). A 10 mg polypropylene or polyethylene sample is dissolved at 160° C. in 10 ml of trichlorobenzene (technical grade) for 1 hour. Analytical conditions for the GPCV 2000 from WATERS are:
Injection volume: +/−400 μl
Automatic sample preparation and injector temperature: 160° C.
Column temperature: 145° C.
Detector temperature: 160° C.
Column set: 2 Shodex AT-806MS and 1 Styragel HT6E Flow rate: 1 ml/min
Detector: Infrared detector (2800-3000 cm$^{-1}$)
Calibration: Narrow standards of polystyrene (commercially available)
Calculation for polypropylene: Based on Mark-Houwink relation ($\log_{10}(M_{PP})=\log_{10}(M_{PS})-0.25323$); cut off on the low molecular weight end at $M_{PP}=1000$.

The molecular weight distribution (MWD) is then calculated as $M_w/M_n$.

The $^{13}$C-NMR analysis is performed using a 400 MHz Bruker NMR spectrometer under conditions such that the signal intensity in the spectrum is directly proportional to the total number of contributing carbon atoms in the sample. Such conditions are well known to the skilled person and include for example sufficient relaxation time etc. In practice the intensity of a signal is obtained from its integral, i.e. the corresponding area. The data is acquired using proton decoupling, 4000 scans per spectrum, a pulse repetition delay of 20 seconds and a spectral width of 26000 Hz. The sample is prepared by dissolving a sufficient amount of polymer in 1,2,4-trichlorobenzene (TCB, 99%, spectroscopic grade) at 130° C. and occasional agitation to homogenize the sample, followed by the addition of hexadeuterobenzene ($C_6D_6$, spectroscopic grade) and a minor amount of hexamethyldisiloxane (HMDS, 99.5+%), with HMDS serving as internal standard. To give an example, about 200 mg of polymer are dissolved in 2.0 ml of TCB, followed by addition of 0.5 ml of $C_6D_6$ and 2 to 3 drops of HMDS.

Following data acquisition the chemical shifts are referenced to the signal of the internal standard HMDS, which is assigned a value of 2.03 ppm.

The isotacticity is determined by $^{13}$C-NMR analysis on the total polymer. In the spectral region of the methyl groups the signals corresponding to the pentads mmmm, mmmr, mmrr and mrrm are assigned using published data, for example A. Razavi, Macromol. Symp., vol. 89, pages 345-367. Only the pentads mmmm, mmmr, mmrr and mrrm are taken into consideration due to the weak intensity of the signals corresponding to the remaining pentads. For the signal relating to the mmrr pentad a correction is performed for its overlap with a methyl signal related to 2,1-insertions. The percentage of mmmm pentads is then calculated according to % $mmmm = AREA_{mmmm}/(AREA_{mmmm}+AREA_{mmmr}+AREA_{mmrr}+AREA_{mrrm}) \cdot 100$ Determination of the percentage of 2,1-insertions for a metallocene propylene homopolymer: The signals corresponding to the 2,1-insertions are identified with the aid of published data, for example H. N. Cheng, J. Ewen, Makromol. Chem., vol. 190 (1989), pages 1931-1940. A first area, AREA1, is defined as the average area of the signals corresponding to 2,1-insertions. A second area, AREA2, is defined as the average area of the signals corresponding to 1,2-insertions. The assignment of the signals relating to the 1,2-insertions is well known to the skilled person and need not be explained further. The percentage of 2,1-insertions is calculated according to 2,1-insertions(in %) = $AREA1/(AREA1+AREA2) \cdot 100$ with the percentage in 2,1-insertions being given as the molar percentage of 2,1-inserted propylene with respect to total propylene.

The determination of the percentage of 2,1-insertions for a metallocene random copolymer of propylene and ethylene is determined by two contributions:
(i) the percentage of 2,1-insertions as defined above for the propylene homopolymer, and
(ii) the percentage of 2,1-insertions, wherein the 2,1-inserted propylene neighbors an ethylene, thus the total percentage of 2,1-insertions corresponds to the sum of these two contributions. The assignments of the signal for case (ii) can be done either by using reference spectra or by referring to the published literature.

Melting temperatures $T_{melt}$ are measured on a DSC Q2000 instrument by TA Instruments based on ISO 3146. To erase the thermal history the samples are first heated to 200° C. and kept at 200° C. for a period of 3 minutes. The reported melting temperatures $T_{melt}$ are then determined with heating and cooling rates of 20° C./min.

Flexural modulus was determined according to ISO 178: 2001.

Notched izod impact strength was determined according to ISO 180/A:2000 at 23° C.

Haze was measured according to ISO 14782:1999 on injection molded plaques having a thickness of 1 mm. Melt temperature was 230° C.

The total ethylene content (wt % $C_2$) relative to the total weight of the propylene polymer is determined by NMR analysis of pellets according to the method described by G. J. Ray et al. in Macromolecules, vol. 10, n° 4, 1977, p. 773-778 or alternatively.

EXAMPLES

The following examples may help in illustrating the advantages of the present caps and closures with respect to conventional caps and closures.

The random copolymers of propylene and ethylene of Example 1 and Example 2 were produced in a bulk loop reactor with a metallocene-based polymerization catalyst with a dimethylsilyl-bridged bis(indenyl)zirconium dichloride as metallocene component.

The random copolymer of propylene and ethylene or Comparative Example 1 was produced in a bulk loop reactor using a commercially available Ziegler-Natta polymerization catalyst.

Further properties of the random copolymers are given in Table 1. Exemplary mechanical and optical properties are given in Table 2.

TABLE 1

|  | Unit | Example 1 | Example 2 | Comparative example 1 |
|---|---|---|---|---|
| Melt flow index | dg/min | 62 | 60 | 40 |
| Ethylene content | wt % | 2.3 | 2.1 | 3.5 |
| $T_{melt}$ | ° C. | 141 | 138 | 147 |

TABLE 2

|  | Unit | Example 1 | Example 2 | Comparative example 1 |
|---|---|---|---|---|
| Flexural modulus 1% | MPa | 1170 | 1240 | 1050 |
| Izod, notched at 23° C. | kJ/m$^2$ | 4.0 | 3.5 | 4.2-4.7 |
| Haze | % | 8.1 | 8.5 | 10-12 |

Thus, the random copolymers of Examples 1 and 2 are characterized by high stiffness as well as improved haze performance while at the same time keeping an acceptable level of impact performance.

The invention claimed is:
1. Cap or closure consisting of a polypropylene composition, which comprises at least 70 wt %, relative to the total weight of said polypropylene composition, of a random copolymer of propylene and at least one comonomer, said at least one comonomer being different from propylene, wherein said random copolymer has a comonomer content of at most 4.0 wt %, relative to the total weight of said random copolymer, a molecular weight distribution, defined as $M_w/M_n$, of at most 4.0 and a percentage of 2,1-insertions of at least 0.1%, relative to the total number of propylene molecules in the polymer chain.

2. Cap or closure according to claim 1, wherein the random copolymer has a comonomer content of at least 0.5 wt %, relative to the total weight of said random copolymer.

3. Cap or closure according to claim 1, wherein the random copolymer is a random copolymer of propylene and at least one comonomer, wherein the at least one comonomer is an alpha-olefin different from propylene.

4. Cap or closure according to claim 1, wherein the random copolymer is characterized by a content of mmmm pentads of at least 90%.

5. Cap or closure according to claim 1, wherein the random copolymer comprises at least one additive selected from the group consisting of nucleating agents, antistatic agents, processing aids and blends of any of these.

6. Cap or closure according to claim 1, wherein the random copolymer has a melt flow index of at least 20 dg/min, determined according to ISO 1133, condition L, at 230° C. and 2.16 kg.

7. Cap or closure according to claim 1, wherein the random copolymer has a melt flow index of at most 200 dg/min, determined according to ISO 1133, condition L, at 230° C. and 2.16 kg.

8. Cap or closure according to claim 1, wherein the random copolymer has a melt flow index of at least 20 dg/min and at most 200 dg/min, determined according to ISO 1133, condition L, at 230° C. and 2.16 kg.

9. Cap or closure according to claim 1, wherein the polypropylene composition further comprises one or more thermoplastic polymers different from the random copolymer.

10. Cap or closure according to claim 9, wherein the one or more thermoplastic polymers comprise propylene homopolymer, copolymer of propylene and at least one comonomer, ethylene homopolymer, or copolymer of ethylene and at least one comonomer.

11. Cap or closure according to claim 9, wherein the one or more thermoplastic polymers comprise propylene homopolymer or copolymer produced with a Ziegler-Natta polymerization catalyst and characterized by the absence of 2,1-insertions.

12. Cap or closure according to claim 9, wherein the random copolymer is prepared in the presence of a metallocene component of the formula:

$$(\mu\text{-}R^a)(R^b)(R^c)MX^1X^2 \qquad (I)$$

wherein $R^a$ is a bridge between $R^b$ and $R^c$ and is selected from the group consisting of: $-(CR^1R^2)_p-$, $-(SiR^1R^2)_p-$, $-(GeR^1R^2)_p-$, $-(NR^1)_p-$, $-(PR^1)_p-$, $-(N^+R^1R^2)_p-$ and $-(P^+R^1R^2)_p-$, and p is 1 or 2, and wherein $R^1$ and $R^2$ are each independently selected from the group consisting of hydrogen, $C_1$-$C_{10}$ alkyl, $C_5$-$C_8$ cycloalkyl, $C_6$-$C_{15}$ aryl, alkylaryl with $C_1$-$C_{10}$ alkyl and $C_6$-$C_{15}$ aryl, or any two neighboring R may form a cyclic saturated or non-saturated $C_4$-$C_{10}$ ring;

wherein M is a metal selected from Ti, Zr and Hf;

wherein $X^1$ and $X^2$ are independently selected from the group consisting of halogen, hydrogen, $C_1$-$C_{10}$ alkyl, $C_6$-$C_{15}$ aryl, alkylaryl with $C_1$-$C_{10}$ alkyl and $C_6$-$C_{15}$ aryl; and wherein $R^b$ and $R^c$ are selected independently from one another and comprise a cyclopentadienyl ring.

13. Cap or closure according to claim 12, wherein $R^b$ and $R^c$ are both substituted cyclopentadienyl.

14. Cap or closure according to claim 12, wherein $R^b$ is a substituted cyclopentadienyl and $R^c$ is a substituted or unsubstituted fluorenyl.

15. Cap or closure according to claim 12, wherein $R^b$ and $R^c$ are both be the same and are selected from the group consisting of substituted cyclopentadienyl, unsubstituted indenyl, unsubstituted tetrahydroindenyl and substituted tetrahydroindenyl.

16. Cap or closure according to claim 1, wherein the at least one comonomer is ethylene.

17. Cap or closure according to claim 1, wherein the random copolymer has a percentage of 2,1-insertions of at most 1.5%, relative to the total number of propylene molecules in the polymer chain.

18. Cap or closure according to claim 1, wherein the polypropylene composition comprises at least 80 wt %, relative to the total weight of said polypropylene composition, of the random copolymer of propylene and at least one comonomer.

19. Cap or closure according to claim 1, wherein the polypropylene composition comprises at least 90 wt %, relative to the total weight of said polypropylene composition, of the random copolymer of propylene and at least one comonomer.

20. Packaging comprising the cap or closure of claim 1.

21. Packaging according to claim 20, said packaging being selected from the group consisting of food packaging, detergent packaging, cosmetic packaging, paint packaging or medical packaging.

22. Process for the production of the cap or closure of claim 1, said process comprising the steps of
(a) polymerizing propylene and at least one comonomer with a metallocene-based polymerization catalyst to obtain a random copolymer of propylene and at least one comonomer,
(b) melting a polypropylene composition, which comprises at least 70 wt %, relative to the total weight of said polypropylene composition, of the random copolymer of propylene and at least one comonomer obtained in step (a);
(c) injecting the molten polypropylene composition of step (b) into an injection mold,
(d) cooling the mold to solidify the polypropylene composition; and
(e) recovering the injection-molded cap or closure,
wherein said at least one comonomer is different from propylene, and wherein said random copolymer has a comonomer content of at most 4.0 wt %, relative to the total weight of said random copolymer, a molecular weight distribution, defined as $M_w/M_n$, of at most 4.0 and a percentage of 2,1-insertions of at least 0.1%, relative to the total number of propylene molecules in the polymer chain.

23. Process according to claim 22, wherein the random copolymer has a comonomer content of at least 0.5 wt %, relative to the total weight of said random copolymer.

* * * * *